(12) United States Patent
Maes

(10) Patent No.: US 7,418,382 B1
(45) Date of Patent: Aug. 26, 2008

(54) STRUCTURE SKELETONS FOR EFFICIENT VOICE NAVIGATION THROUGH GENERIC HIERARCHICAL OBJECTS

(75) Inventor: Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/806,549

(22) PCT Filed: Oct. 1, 1999

(86) PCT No.: PCT/US99/22915

§ 371 (c)(1), (2), (4) Date: Jun. 25, 2001

(87) PCT Pub. No.: WO00/21073

PCT Pub. Date: Apr. 13, 2000

Related U.S. Application Data

(60) Provisional application No. 60/117,595, filed on Jan. 27, 1999, provisional application No. 60/102,957, filed on Oct. 2, 1998.

(51) Int. Cl.
G10L 15/08 (2006.01)
(52) U.S. Cl. ............ 704/236; 704/275; 704/270.1
(58) Field of Classification Search ........... 704/270.1, 704/275, 200.1; 709/236
See application file for complete search history.

(56) References Cited

U.S. PATENT DOCUMENTS 5,644,686 A * 7/1997 Hekmatpour ............... 706/45

(Continued)

FOREIGN PATENT DOCUMENTS

JP 10-124378 5/1998

(Continued)

OTHER PUBLICATIONS

Patent Abstracts of Japan for Publication No. 10-222525.

(Continued)

Primary Examiner—Michael Opsasnick
(74) Attorney, Agent, or Firm—F. Chau & Associates, LLC

(57) ABSTRACT

A system and method for providing fast and efficient conversation navigation via a hierarchical structure (structure skeleton) which fully describes functions and services supported by a dialog (conversational) system. In one aspect, a conversational system and method is provided to pre-load dialog menus and target addresses to their associated dialog managing procedures in order to handle multiple or complex modes, contexts or applications. For instance, a content server (web site) (106) can download a skeleton or tree structure (109) describing the content (page) (107) or service provided by the server (106) when the client (100) connects to the server (106). The skeleton is hidden (not spoken) to the user but the user can advance to a page of interest, or to a particular dialog service, by uttering a voice command which is recognized by the conversational system reacting appropriately (as per the user's command) using the information contained within the skeleton. The skeleton (109) provides the necessary information to allow a user to quickly browse through multiple pages, dialog components, or NLU dialog forms to find information of interest without having to follow and listen to every possible page or form leading to a desired service or conversational transaction.

26 Claims, 2 Drawing Sheets

U.S. PATENT DOCUMENTS

| | | | |
|---|---|---|---|
| 5,721,827 A * | 2/1998 | Logan et al. | 709/217 |
| 5,742,845 A * | 4/1998 | Wagner | 710/11 |
| 5,819,092 A * | 10/1998 | Ferguson et al. | 717/113 |
| 5,960,399 A | 9/1999 | Barclay et al. | |
| 6,029,195 A * | 2/2000 | Herz | 725/116 |
| 6,253,326 B1 * | 6/2001 | Lincke et al. | 713/201 |
| 6,269,336 B1 * | 7/2001 | Ladd et al. | 704/270 |
| 6,385,583 B1 | 5/2002 | Ladd et al. | |
| 6,397,259 B1 * | 5/2002 | Lincke et al. | 709/236 |
| 6,400,996 B1 * | 6/2002 | Hoffberg et al. | 700/83 |
| 6,519,617 B1 * | 2/2003 | Wanderski et al. | 715/513 |
| 6,529,889 B1 * | 3/2003 | Bromberg et al. | 706/45 |
| 6,553,373 B2 * | 4/2003 | Boguraev et al. | 707/5 |
| 6,615,172 B1 * | 9/2003 | Bennett et al. | 704/257 |
| 6,636,831 B1 * | 10/2003 | Profit et al. | 704/275 |
| 6,829,603 B1 * | 12/2004 | Chai et al. | 707/5 |
| 6,999,990 B1 * | 2/2006 | Sullivan et al. | 709/205 |

FOREIGN PATENT DOCUMENTS

JP     10-222525     8/1998

OTHER PUBLICATIONS

Patent Abstracts of Japan for Publication No. 10-124378.

* cited by examiner

STRUCTURE SKELETONS FOR EFFICIENT VOICE NAVIGATION THROUGH GENERIC HIERARCHICAL OBJECTS

This application is based on provisional applications U.S. Ser. No. 60/102,957, filed on Oct. 2, 1998, and U.S. Ser. No. 60/117,595 filed on Jan. 27, 1999.

BACKGROUND

1. Technical Field

The present application relates generally to conversational systems and, more particularly, to a system and method for providing fast and efficient conversational navigation of, e.g., pages of CML (conversational markup language) of a particular site (e.g., Web site) or a conversational service using a skeleton or tree structure that describes the site, a portion of the site, or a service when the user first connects to a service provider, or complex dialog associated with a given service.

2. Description of Related Art

In the near future, conversational systems such as NLU (natural language understanding) and NLG (natural language generation) as well as dialog management are poised to become an essential component of human/machine interfaces. To make such conversational systems more functional, such systems should allow a user to express queries as naturally as the user would in a normal conversation. Indeed, such systems should afford mixed or directed initiatives in which the user may complete, correct, modify or disambiguate his/her queries based on the reaction of the system, as well as the capability of using queries to shortcut complex hierarchical menus.

Conventional instantiations of natural dialog systems, however, are designed such that the user follows a relatively narrow logic in the sequence or the elements that constitute his or her query. This is true with FSG (Finite State Grammar) or pure statistical NLU systems. Indeed, NLU is concerned with the understanding of the input for a given context, application or query mode.

Moreover, with conversational systems, it is difficult to present a complex service to a user (e.g., a web page, hierarchical DTMF menu, NLU/NLG systems with multiple options and a form-based implementation) when a voice output is only available as output. Typically, the user must navigate through multiple web pages or DTMF menus to find the information of interest. Accordingly, a system and method for providing the necessary information to allow a user to quickly browse through a site or available dialog service without having to follow and listen to every possible page or menu leading to the desired service or transaction is highly desirable.

SUMMARY OF THE INVENTION

The present invention is directed to a system and method for providing fast and efficient conversation navigation via a hierarchical structure (structure skeleton) which fully describes functions and services supported by a dialog (conversational) system.

In one aspect, a conversational system and method is provided to pre-load dialog menus and target addresses to their associated dialog managing procedures in order to handle multiple or complex modes, contexts or applications. For instance, a content server (web site) can download a skeleton or tree structure describing the content (pages) or service provided by a server when the user first connects to the server. The skeleton is hidden (not spoken) to the user but the user can advance to a page of interest, or to a particular dialog service, by uttering a voice command which is recognized by the conversational system reacting appropriately (as per the user's command) using the information contained within the skeleton.

The present invention is particularly advantageous to a system having speech as the only input modality since it allows a power user to shortcut conversational navigation through multiple pages, dialog components, or NLU dialog forms to find information of interest. The skeleton provides the necessary information to allow a user to quickly browse through the site or available service without having to follow and listen to every possible page leading to the desired service or transaction.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

Figure 1:
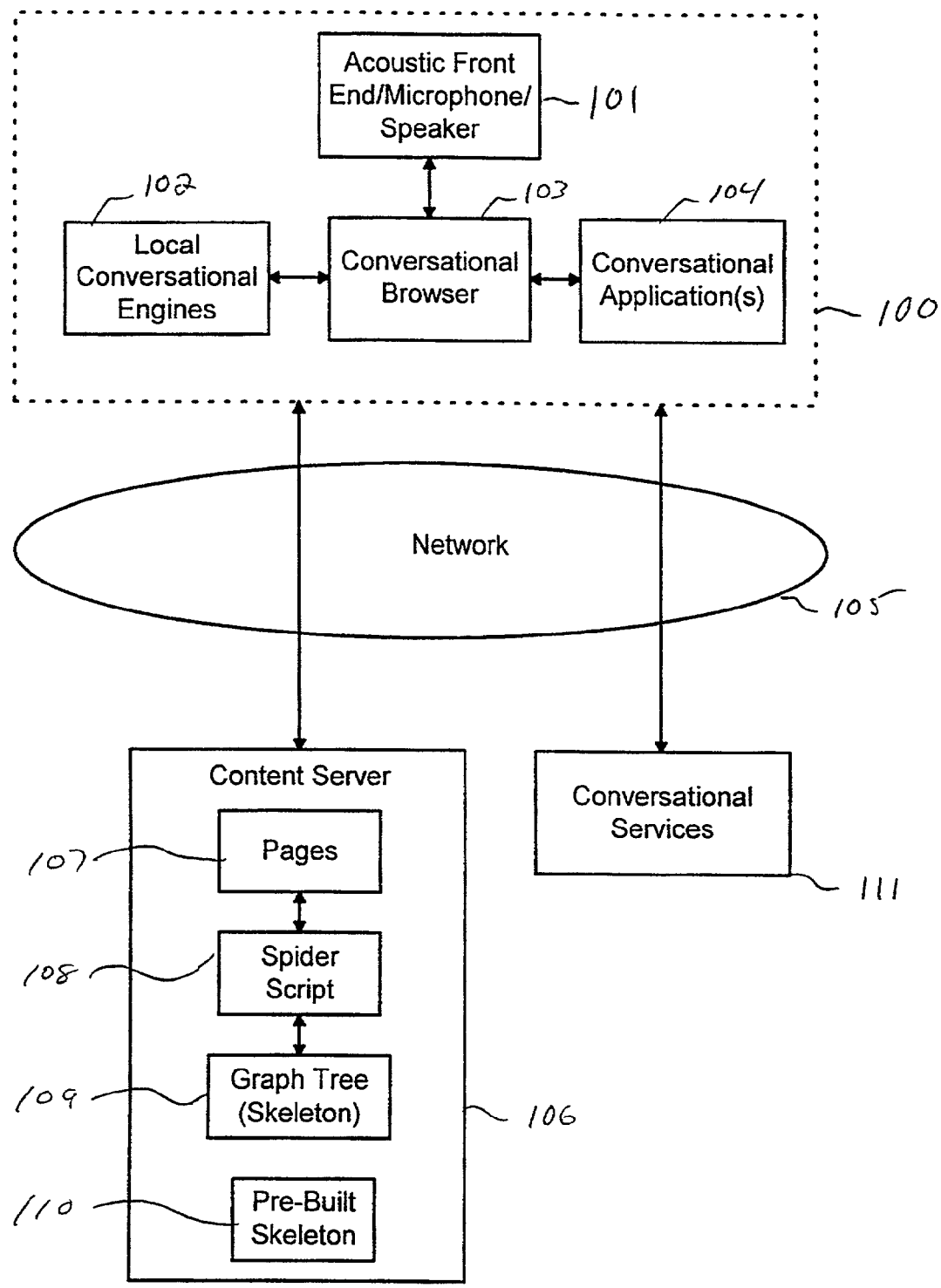
FIG. 1 is a block diagram of a system for providing conversational navigation using conversational skeletons according to an embodiment of the present invention.

It is to be understood that the present invention may be implemented in various forms of hardware, software, firmware, special purpose processors, or a combination thereof. Preferably, the present invention is implemented an application comprising program instructions that are tangibly embodied on a program storage device (e.g., magnetic floppy disk, RAM, CD ROM, ROM and Flash memory) and executable by any device (embedded or otherwise) or machine comprising suitable architecture. It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

It is to be further understood that the present invention may be implemented in any conversational/dialog based system wherein, for example, a user may have to listen to large portions of pages, menus or dialog components or navigate hierarchically through a large set of pages, menus or dialog components before reaching information or services of interest. Notwithstanding that present invention may be employed such system, for purposes of illustration, the present invention will be described in relation to the conversational browser and CVM (conversational virtual machine) systems disclosed in the patent applications PCT/US99/23008, entitled "Conversational Browser and Conversational Systems", and PCT/US99/22927, entitled "Conversational Computing Via Conversational Virtual Machine," both of which are filed concurrently herewith, commonly assigned, and fully incorporated herein by reference.

The above-incorporated application PCT/US99/23008 describes employing a conversational browser and CML (conversational markup language) for building conversational systems using a set of interlinked pages written in CML. This novel concept is analogous to building conventional GUI browser applications using a set of interlinked pages written using HTML (hypertext markup language). Moreover, just as HTML provides a set of mechanisms for translating GUI actions into application actions such as visiting other pages or communicating with a server, the conversational browser and CML are used for translating spoken inputs into similar application actions.

In particular, a CML page describes the conversational UI to be interpreted and presented to the user via the conversational browser. In one embodiment, CML pages are defined by tags which are based on the current XML (extensible markup language) specification. The primary elements are , <body>, <menu>, and <form>. Page elements group other CML elements, and serve as the top-level element for a CML document. Body elements specify output to be spoken by the browser. Menu elements present the user with a list of choices, and associate with each choice a target address (e.g., URL, socket address) identifying a CML element to visit if the user selects that choice. Form elements allow the user to provide one or more pieces of information, where the content of each piece of information is described by, e.g., a grammar. In addition, dialog objects (such as applets) can be loaded in the page. Moreover, multiple simultaneous forms for NL dialogs can optionally be loaded in a CML page. In this instance, the content can be described using a language model and tagging and parsing arguments instead of, or in addition to, a grammar. The form element also specifies a target address to visit when the user has completed the form.

As described more fully in the above-incorporated references, in a pure conversational system using a conversational browser, speech and audio are the only output provided to the user. When a user so desires, a CML page is downloaded from the service provider. Then, using text-to speech markup language information in the CML page, the conversational browser reads the page back to the user and listens for commands from the user to be decoded by the speech recognizer (using clues from the speech recognition portion of the CML page) to follow links, fill forms, or command the browser.

This conversational interface implies that the user often may have to either listen to large portions of the CML page or navigate hierarchically a large set of CML pages before reaching the information of interest. As discussed in the above-incorporated PCT/US99/23008, one approach for navigation using the conversational browser is the "what you hear is what you can say" approach, whereby a user could shortcut the browsing by referring to pages and links that were already spoken to the user. In addition, another form of navigation is to activate all links on a loaded page even if such links are not yet spoken to the user. However, each of these approaches requires the user to browse through successive pages to reach pages that are not linked on the first page. An alternate approach will now be discussed below with reference to the illustrative embodiments.

Referring now to FIG. 1, a block diagram illustrates a system for providing efficient conversational navigation according to an embodiment of the present invention. The system comprises a client device 100 which may be, for example, a personal computer, a smartphone, a PDA (personal digital assistant), or any speech-enabled pervasive computing (PvC) device. The client device 100 comprises an acoustic front end/microphone/speaker 101 for processing audio/speech input, and for outputting audio/speech generated by a conversational browser 103. The client device 100 further comprises one or more local conversational engines 102 for processing the acoustic features and/or waveforms generated and/or captured by the acoustic front-end 101 and for generating spoken output at the request and management of the conversational browser 103. The local conversational engines 102 may include, for example, an embedded speech recognition engine, a speaker recognition engine, a TTS (text-to-speech) engine, a NLU (natural language understanding) engine and/or a NLG (natural language generation) engine. The conversational browser 103 interacts with one or more speech-enabled local applications 104 to provide spoken output to the user related to such applications.

As shown in FIG. 1 by way of example, the client device 100 is network-connected via network 105 to a remote server 106 that comprises one or more "sites", e.g., CML pages 107. It is to be understood that the term "site" used herein refers to the collection of related CML files (or pages) for a particular CML page. In addition, notwithstanding that only one server 106 is shown in FIG. 1, it is to be understood that a particular "site" may be spread over a number of additional servers (not shown) connected to the network 105 in different locations. Therefore, for illustrative purposes, all the pages that are related to a particular "site" are assumed to be on the same server 106.

In addition, it is to be understood that the conversational engines 102 may be distributed over the network 105 (notwithstanding that they are illustrated in FIG. 1 as being local to the client device 100) and accessible using the techniques disclosed in PCT/US99/22925, filed concurrently herewith, entitled "System and Method for Providing Network Coordinated Conversational Services," which is commonly assigned and incorporated herein by reference. This concept is depicted in FIG. 1, for example, by the conversational services server 111, which can provide any form of conversational services. The conversational services server 111 can represent more than one server, notwithstanding that only one server 111 is illustrated. Furthermore, the conversational browser 103 can be located over the network and accessible by the client device 100.

The content server 106 according to the present invention comprises a spider script 108 (as is known in the art) for dynamically generating a graph tree or skeleton 109 either prior to or upon the server 106 being accessed by the client device 100 (via the conversational browser 103). The skeleton 109 in this respect may be a hierarchical structured document (file) which describes a requested "site" or portion of the "site" that is downloaded when the user first connects to the server 106. In particular, when the client 100 initially establishes network connection to the content server 106, the server 106 will execute the spider script 108 (i.e., an application known in the art as a "crawler," "robot" or "bot") which "scrawls" through each link in the requested CML page to extract information (e.g., from title, meta information provided by author or by automatic topic extraction) and store it into a graph tree structure 109 mapping the page with the relative extracted meta-information. Alternatively, the server 106 can provide a skeleton 110 which is pre-built by the author for each particular page 107 located within the server 106. As such, the spidering is performed in advance and the skeleton can, thus, be transferred upon connection to the server without delay resulting from waiting for the spidering to be performed.

It is to be understood that the spidering function may be implemented using other techniques other than conventional spidering. For example, one alternative over conventional methods is through protocol calls for having a conversational browser (or the underlying platform, e.g. CVM) connecting to the web server and obtaining the information from a map provided by the server. Alternatively, it could obtain such information from other caching/storage functions stored elsewhere in the network for the purpose of providing adequate call routing and traffic/load balancing across the network as described in PCT/US99/22925.

It is to be understood that the spidering can be performed by the content provider 106, the conversational services server 111 or by the conversational browser 103. Preferably, the spidering is performed in advance. Indeed, although either the client 100 or servers 106, 111 can generate the spidering upon connection to the site, this is not as practical as performing the spidering in advance as access to the skeleton (and thus the dialog initiation) would be delayed. Accordingly, the server 106 can periodically spider the site and store the resulting skeleton so that is can be sent to the client 100 upon connection. For a telephony browser (where the conversational browser in located on a remote server), since there is typically a limited amount of possible sites accessible by the server conversational browser (or browser platform, e.g., CVM), the browser can perform the spidering instead of server 106.

It is to be further understood that notwithstanding that the exemplary embodiment of FIG. 1 illustrates the server 106 being network connected to the client 100, depending on the application, the server function could be encapsulated in an application or dialog executing or coming from a resource that is local to the client 100, and that the client 100 and the server 106 may be the same machine. In addition, the site may be an actual site, a dialog or an application (local or remote). It is to be further understood that the skeleton 109 may be stored in (and accessible from) any machine in the network 105 such as the client 100, the server 106, a gateway or a router.

In the illustrative embodiment, the skeleton (109 or 110) is provided in the form of a CML file (although it is to be understood that the skeleton may be provided as a procedural input as opposed to declarative form (e.g., XML, CML)). It is to be understood that regardless of the implementation (that it be CML, any other declarative mechanism, procedural, etc.), the generic functionalities performed by structure skeleton, to convey information, remain the same. Such information comprises a hierarchical menu of the different components of the dialog associated to an application or a site; options at the level of the each dialog menu; and/or dialog components comprising each menu (each of which is explained below).

Each element of the skeleton (109, 110) is marked up using a hidden tag such that the elements are not spoken by the conversational browser 103 to the user. For example, the skeleton portion of the CML document may be marked up using <skeleton></skeleton> tags or any equivalent. The pages of the skeleton are provided in the form of a conventional path (prefix, infix, etc.) through the site directory structure.

The following is one example of a skeleton in a CML file format:

```
<skeleton>
<Hidden>
<Menu>
<a target="target address 1">politics</a><Menu>
  <a target = "target address 2">International</a><Menu>
    <a target="target address 3">Europe</a><Menu>
      <a target="target address 4">Belgium</a>
      <a target="target address 5">France</a>
    </Menu>
```

-continued

```
    <a target="target address 6">Africa</a>
  </Menu>
  <a target="target address 7">US</a>
</Menu>
<a target="target address x">business</a>
<a target="target address y">weather</a>
<a target="target address z">sport</a><Menu>
  <a target="target address z2">International</a><Menu>
    <a target="target address z3">Europe</a><Menu>
      <a target="target address z4">Belgium</a>
      <a target="target address z5">France</a>
    </Menu>
    <a target="target address z6">Africa</a>
  </Menu>
  <a target="target address z7">US</a>
</Menu>
</Menu>
</Hidden>
</skeleton>
```

As can be readily seen, the above skeleton structure represents a hierarchical tree structure with a target at each node for a recipe to fulfill the associated query. For example, the anchor tags <a> ... </a> combined with the "target" attribute creates a "link" as is understood by those in the art. Each "target address" can be a URL or socket address, for example, or any other address where the dialog or portions/arguments of the dialog can be obtained. For instance, the target address may be a URL in the case of HTTP protocols and conversational browser applications. Based on the above example, a user accessing CNN site can immediately access the "international" news about "Belgium" or request any service on currency exchange rates, instead of painstakingly going through the pages: news, international, Europe, Belgium, etc.

It is to be appreciated that in the above model, any target can refer to an address to access the following:

1. A CML page (e.g., URL) for a conversational browser.

2. A procedure for driving the dialog of a particular mode/service (e.g. an applet or cgi script, ActiveX component) or regular procedure to complete a user query (such as a conversational service 111 over the network 105 as depicted in FIG. 1). For example, the services can include local plug-in for audio capture, CODEC compression and communication protocols and infrastructure for distributed processing as well as the corresponding elements on the server side as described in the above-incorporated PCT/US99/22925. Moreover, a procedure can be loaded to perform the dialog instead of relying on a CML page to implement the dialog. This can be any program talking directly to a different conversational engine to build a dialog or it can be a combination of dialog components and foundation class objects (as discussed in the above incorporated PCT/US99/22927 as well as services provided by the underlying platform (e.g., CVM). Indeed, a procedure can be NLU/NLG, FSG driven, with the initiative to the user (user has to build his query), the system (the system asks questions after questions to fill all the arguments needed to qualify a query, or mixed initiative: the user and the system interact to complete a non-ambiguous query. More specifically, with mixed initiative, the user and system are both driving the dialog. The user can initiate a query about what is activated without being prompted by the machine. In addition, the user provide more answers or answer differently than what is asked by the machine. If the dialog supports the domain of the user's input, and has activated the functions that his query requests (e.g., has the corresponding form) the dialog will switch to complete, correct, and/or disambiguate the query. With machine directed dialog, the machine drives the dialog, i.e., the user must answer the specific prompts. In accordance with the present invention, the user can activate the skeleton to jump to another prompt and continue the machine driven dialog from that prompt. With user directed dialog, the user drives the dialog by making queries until they are complete and unambiguous, and then the machine executes them (this is analogous to form filling in HTML whereby the user fills a form and submits the form when the user is satisfied).

3. A set of forms that may be presented to the user to complete via form based NLU/NLG for the service denoted by the given node; and 4. The location where the speech (waveform, features) should be sent for processing such as described in the above incorporated application PCT/US99/22925.

Forms are discussed in the references Kishore, et al. "Free-Flow Dialog Management Using Forms," Proc. Eurospeech 1999, Budapest Hungary, September 1999 and Davies and al., "The IBM Conversational Telephony System For Financial Applications," Proc. Eurospeech 99, Budapest Hungary, September 1999 which are incorporated herein by reference.

Therefore, as discussed above, the skeleton can initiate a skeleton specific dialog (hidden or not). This means that a form or a dialog component (conversational object) can be loaded to allow the user to take advantage of the skeleton functionalities (rather than by the CML hidden component). The skeleton can refer to new forms, CML pages or procedural dialogs. Also the skeleton can be provided as a CML, extra form or procedural dialog component.

Moreover. As indicated above, the present invention provides automatic extraction of a skeleton from a site to map the logic of a transaction or the content of a particular site. In addition, the skeleton may be developed or written by the site developer/business logic owner or the content provider. It is to be understood that the when the skeleton is written/developed, the logic of the application as well as the logic of the dialog should be captured (it is to be understood that the capture of the dialog may be multi-modal in that it can contain a GUI and speech component (synchronized) or other modalities, or limited to only speech or GUI). The dialog capture is not limited to the CML approach. Indeed, when the conversational browser or any other conversational application is written on top of a CVM (as described in the above incorporated PCT/US99/23008 and PCT/US99/22927, the hidden portions of the dialog should still be captured, whether it be the full business logic of the application or the shorter range of logic behind dialog components.

Accordingly, in procedural cases, applications can exchange business logic information by exchanging object structures with content that is similar to the exemplary XML skeleton structures discussed herein (typically with a header defining the amount and nature of the fields). These procedural (e.g., RPC (remote procedural calls)) exchanges of objects can carry more information. Indeed, these objects can also contain the entire dialog manager, dialog logic and context of a dialog module (i.e., a portion of the dialog). This can be a full-blown implementation of a dialog, with all the engine calls and UI components. For example, it can be a full grammar-based or NL-based dialog aimed at collecting a phone number. Another option is to provide a set of conversational foundation classes that implement elementary dialog components. These conversational foundation classes and objects are described the above-incorporated PCT/US99/22927.

Complex dialogs can be built by combining such foundation classes sequentially or in parallel. Sequential combination uses the components sequentially interleaved with code implementing extra UI, behavior and dialogs, as well as performing logic operations. Parallel combination of such classes activates the different dialog management as simultaneous applications. The underlying dialog manager provided by a CVM determines the active dialog. A CVM provides a library of the foundation classes. Therefore, during a download, these classes are not transferred but linked on the browser or the CVM platform.

Furthermore, in the case of conversational browsers, forms with simultaneous scope (as described in the above incorporated PCT/US99/23008), as well as applets, plug-ins and other dialog modules can be considered as examples of skeletons exposing the complete logic of a dialog.

Accordingly, a skeleton can be any structure, based on XML (or other declarative techniques) or procedures (or a combination thereof) that captures and activates, in advance, portions of the dialog that would otherwise be hidden by the dialog logic or the business logic until the user navigates through the dialog to activate that portion of the dialog. The skeleton driven dialog can be activated via a declarative platform (e.g. conversational browser) or procedural platform (e.g. dialog components etc) as a portion of the application dialog. This application dialog can it self be procedural or declarative based or any combination of it.

Therefore, it is to be understood that the skeleton can be implemented differently than the CML embodiment: the functionalities (i.e. the information to provide via the skeleton) can be implemented via other means such as exchanged objects. In addition, the use of such information can be implemented differently, e.g. via procedural definition of the dialogs or other forms of declarative definition of the dialog.

The following example (as described in detail in PCT/US99/23008) illustrates a combination of forms and procedures to activate the entire logic of a complex dialog:

```
<menu name=main1 scope=global>
<form name=skeleton_form scope= multiple context=maintain></form>
<form name=form1 load=procedure1 scope=multiple context=maintain></form>
<form name=form2 load=form2 scope=multiple context=reset></form>
<form name=form3 load=procedure3 scope=deactivated context=reset></form>
<form name=form4 load=procudure4 scope=multiple context=reset></form>
...
</menu>
```

The above example illustrates that a skeleton form can be loaded in the dialog according to this approach.

Therefore, a structured skeleton according to the present invention can capture the logic of the dialog or business logic of a site or application by exchanging skeleton XML information, skeleton objects, or by pre-loading and activating dialog components. These dialog components can be provided via preloading XML pages, preloading conversational (procedural) objects or a combination thereof. The mechanism of simultaneous scope forms is one example of how this may be achieved in connection with a conversational browser.

By preloading and activating dialog components, access to a given service or portion of the transaction can be expedited without having to follow serial orders, play backs, or menus that are initially provided by the service provider. This is virtually equivalent to a dialog with an operator where the user in not interested in exchanging the information that the operator first tries to obtain but immediately transfers to a given service, immediately provides the minimum information needed to perform a particular query, or to immediately return to a previous transaction so as to carry on the transaction from where it previously was. By having activated the entire dialog, the system is able to, for example, fill the form associated to that query and if enough information is provided, to proceed and complete the query. If the query is not complete, the dialog system will only try to collect the extra information needed to complete the form.

Figure 2:
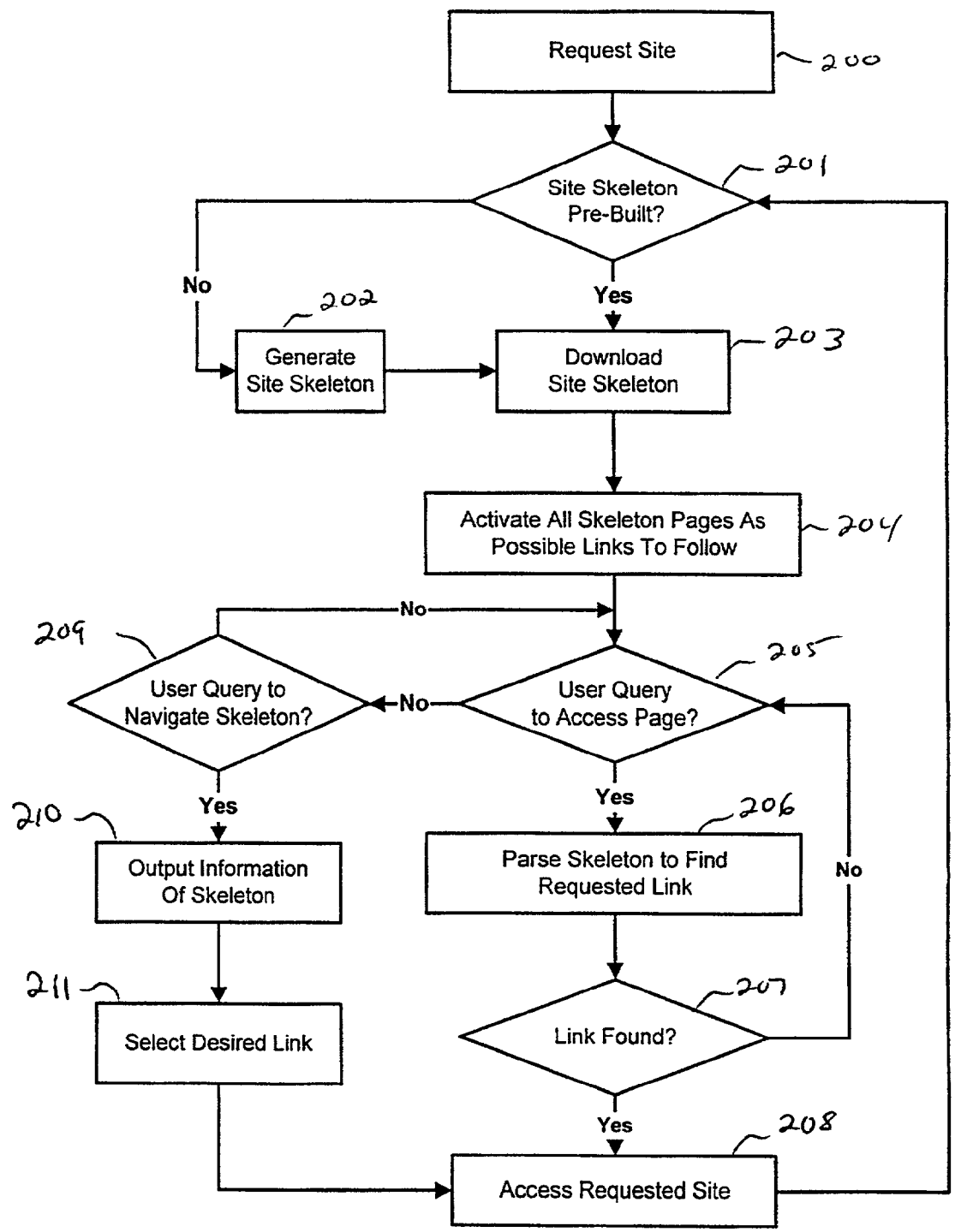
FIG. 2 is a flow diagram of a method for providing conversational navigation using conversational skeletons according one aspect of the present invention.

Referring now to FIG. 2, a flow diagram illustrate a method for providing efficient conversational navigation according one aspect of the present invention. It is to be understood that for purposes of illustration, the method described herein is based on a system employing CML and a conversational browser. Initially, the client device will connect (via the conversational browser) to a server of a service provider to access a particular CML page (site) (step 200). If there is a pre-built skeleton for the requested site (affirmative result in step 201), the pre-built skeleton will be downloaded to the client (step 203).

On the other hand, if no pre-built skeleton exists (negative result in step 201), a site skeleton is automatically generated (step 202) and then downloaded to the client (step 203). It is to be understood that the skeleton may represent the entire site or a portion of the site. In addition, the skeleton can represent an entire dialog (e.g. procedure implementing an entire dialog) or portions of a dialog (e.g. the entire component needed to describe access to a credit card, a telephone number or an e-mail client, the entire dialog component needed to process a calendar entry, to order a ticket, check a schedule etc . . . ) or combination of them. It is to be appreciated, therefore, that the user can jump directly in the middle of the credit card or address filling dialog, possibly before completing his shopping. In addition, the user can jump in a calendar checking dialog, while performing another dialog like a banking transaction or e-mail composition. Accordingly, by capturing and activating other dialog portions (and not only site information), the system can provide the user access to other applications or portions of the applications while performing a given task/dialog. It is to be understood that this may be performed with the CML implementation, whereby each of the dialog portions can be implemented via a specific CML page or via procedures loaded by such pages. It is to be further understood that the site skeleton may be pre-built (in step 201) by the author or pre-built by having the site pre-spidered (as discussed above).

Once the skeleton is downloaded (step 203), the conversational browser will activate all pages (links) contained in the skeleton (204). Initially, although the page links are activated, the skeleton is hidden from (i.e., not spoken) to the user. If the user, however, utters a spoken command to activate a particular link to access a particular page which the user believes is related to the initial downloaded page (affirmative result in step 205), the conversational browser will parse the skeleton to find a link (active document) in the skeleton that corresponds to the recognized user command (step 206). If an activated link is found which corresponds to the user command (affirmative result in step 207), the site will be downloaded (step 208) and the process is repeated (return to step 208). This feature is particularly advantageous with a system having speech as the only input/output modality (it is also advantageous with multi-modal systems). A user familiar with a particular site (and its related sites) can quickly navigate through a series of known CML pages without having to follow and listen to every possible page leading to a desired page, service or transaction.

Alternatively, the user can interrogate the conversational browser to either indicate whether a particular link to a desired topic or service in the skeleton matches a user query or otherwise navigate the skeleton by having the browser read back the information in the skeleton (affirmative result in step 209). Upon query from the user for a given topic or to hear the underlying pages, the browser will search the skeleton and read back the information or identify query matches (step 210). Once the browser provides the requested information, the user can select a desired link (in the skeleton) (step 211) to access a desired site or service (step 208). This aspect of the present invention is particularly advantageous in that the skeleton can comprise not only information about the dialog, but also directly a dialog for the user to explore and follow that information if the user is not familiar with the dialog or if it is such a complex application or site that mixed initiative dialog is needed to find the appropriate shortcut or component to load.

It is to be further appreciated that the "site" skeletons can be extended to encompass the audio equivalent to frames in visual (GUI) browsers. In particular, the additional hidden information that can be navigated or interrogated by the user is compiled by the page author and built by hand by the author and added as a frame (i.e. a separate page loaded with the main CML page). In HTML, frames allow the user to divide the pages into different sub-pages in-line or with targets pointing to different HTML pages. In the same manner, with CML pages, frames can be introduced to present a menu or skeleton to the user. For example, the author can present its site pages as per the following example:

```
<CML>
<frameset interface="hidden,play"><!This means that the first frame is
hidden, the second is played to the user>
<frame 1>
<skeleton target=url1>
</skeleton>
<frame 2>
... [Main CML content page at this stage of the dialog. It can also be
pointed to with a target tag]
</frame 2>
</frameset>
</CML>
```

This is another example of the activation of the dialog. While the previous example illustrates using multiple forms activated in parallel, this example illustrates a different syntax for parallel activation.

As is evident, the present invention may be employed for various functions. In the above incorporated patent application PCT/US99/22927 and PCT/US99/23008, the respective concepts were introduced: "SpokenAge" as application development environment and conversational transcoding as a mechanism to transform conventional presentation material into conversational material (e.g. generic HTML pages into CML pages).

Also discussed in both of the incorporated applications is the concept of functional transcoding: converting the presentation information to CML (i.e., converting a given HTML page into a CML page), and the concept of "logical transcoding." As described in the above incorporated applications PCT/US99/22927 and PCT/US99/23008, logical transcoding involves building a dialog based on the business logic behind the site. Conventionally, this process is very difficult since the transcoder does not have access to information about the "next steps" of the dialog and or the next step of the transaction business logic.

The use of structure skeletons is particularly advantageous for use with logical transcoding since a structure skeleton can capture the business logic (multi-modal, speech only, or GUI only). Of course in this case the skeleton is the structure of an HTML site, for example, instead of a CML site, but the underlying principle with respect to the skeleton does not change. Therefore it is to be understood that concept of a structure skeleton is not limited to spoken dialog, but extends to any dialog even if it is, for example, a GUI based dialog. Therefore, a logical transcoding tool is provided by accessing the skeleton of the dialog/transaction or site and unfolding it to present it to the application developer (as a site map or dialog map) or to the automated transcoder. As such, the transcoded CML dialog can be optimized to encompass all the business logic information now available.

It is to be further appreciated that the present invention is also advantageous for use in connection with a multi-modal conversational browser. Indeed, in multi-modal cases, it is no more certain that the GUI content is designed as a conventional GUI browser. Indeed, truly compelling multi-modal pages will rather use the GUI page to help present some information to the user that would be difficult to present purely by speech. This would still require pre-loading skeleton to enhance dialog navigation through the site.

In another illustrative embodiment of the present invention, a NLU/NLG online banking system involving account management, online payment and investment management can be considered. For example, this system can be built using several forms that correspond to all the actions that can be performed by a user. NLU parsing and translation can be implemented to provide the arguments of all the input fields of the forms, which are compatible with the argument and context. Queries can be embedded by activating a new form (i.e. query) trend before completion of the past one. Upon completion of the embedded query, the past context can be reactivated by looking at the previous forms still incomplete.

If there is an increase in the amount of possible types of queries that can be provided, parallel form filling becomes difficult. Conventionally, the user would have to fill (through NLU queries and mixed initiative) a hierarchy of forms to define his intention. Advantageously, the present invention using a skeleton to represent a higher level menu, can be presented as an extra form that is added for each set of forms to be filled at a given level of the hierarchy. Consequently, a power user of the system can now skip the sequential form filling and immediately narrow the scope of his query by activating (via his query) a desired node of the skeleton.

It is to be appreciated that the present invention can be implemented with other various applications to provide efficient conversational navigation. Example of such systems include:
  PVA (Personal vehicle assistant), where a conversational browser is the main UI environment;
  VA (Virtual assistant) where the NLU/NLG dialog can be driven by forms, FSG or procedures; PDA and smart-phones having conversational browsers;
  Enterprise software solutions and e-business, as well as telephony applications, wherein IVR (interactive voice response) script is replaced with a CML and conversational browser architecture, both of which are described in the above incorporated application PCT/US99/23008P; and
  Telephony/Kiosk applications where a form-based NLU toolkit can be applied.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A system for providing conversational navigations comprising:
  a server computing device comprising means for generating at least one hierarchical structured document, wherein the hierarchical structured document comprises a mapping of content pages that can be accessed from the server computing device or a mapping of logic of dialog services that can be accessed from the server computing device; and
  a client computing device comprising means for enabling user access of the content pages or dialog services of the server computing device, wherein the client computing device processes the at least one hierarchical document to activate the content pages or the logic of the dialog services within the at least one hierarchical document so as to allow the user to directly access any one of the content pages or dialog services.

2. The system of claim 1, wherein the hierarchical structured document is a skeleton comprising a tree having a plurality of nodes with each node having a target address comprising one of a URI, (uniform resource locator) and socket address to information denoted by the corresponding node.

3. The system of claim 1, wherein the mapping of the logic of dialog services comprises a mapping of the logic of an underlying application and dialog of each of the dialog services.

4. The system of claim 1, wherein the at least one hierarchical structured document allows the exchange of procedural and dialog objects for providing the dialog services to the client computing device for execution of the dialog services on the client computing device.

5. The system of claim 1, wherein the means for generating the at least one hierarchical structured document is a spidering application.

6. The system of claim 1, wherein the hierarchical structured document is pre-built.

7. The system of claim 1, wherein the hierarchical structured document is hidden to the user of the client computing device.

8. The system of claim 1, wherein the hierarchical structured document can be interrogated by the user at any time that the hierarchical structured document is active.

9. The system of claim 1, wherein the hierarchical structured document can be interrogated by the user at the beginning of the dialog.

10. The system of claim 1, wherein the hierarchical structured document is a dialog component.

11. The system of claim 1, wherein each node comprises a target address to at least one object.

12. The system of claim 1, wherein the hierarchical structured document is implemented one of procedurally and declaratively.

13. The system of claim 1, wherein the hierarchical document is stored in the server computing device, the client computing device, a gateway, or a router.

14. A computer readable medium encoded with computer executable program instructions, said computer executable instructions causing a computer to perform methods step comprising:

generating at least one hierarchical structured document, wherein the hierarchical structured document comprises a mapping of content pages that can be accessed from a server or a mapping of logic of dialog services that can be accessed from the server; and enabling user access of the content pages or dialog services of the server by processing the at least one hierarchical document to activate the content pages or the logic of the dialog services within the at least one hierarchical document so as to allow the user to directly access any one of the content pages or dialog services.

15. The system of claim 1, wherein each node comprises a target address to a URL, (uniform resource locator) of a CML (conversational markup language) page associated with the node.

16. The system of claim 15, wherein the at least one hierarchical structured document is presented as a frame in a CML page.

17. The system of claim 1, wherein the client computing device is a transcoder and the hierarchical structured document is used for performing logical transcoding by the transcoder to generate one of an HTML (hypertext markup language) page and a CML page.

18. The system of claim 17, wherein the hierarchical structured document represents the structure of an HTML site.

19. The system of claim 17, wherein the hierarchical structured document is one of multi-modal, speech only and GUI (graphical user interface) only.

20. The system of claim 1, wherein each node comprises a target address to a dialog manager responsible for providing a dialog service associated with the node.

21. The system of claim 20, wherein the dialog manager provides form filling based NLU (natural language understanding).

22. The system of claim 20, wherein the dialog manager provides dedicated procedures.

23. The system of claim 20, wherein the dialog manager provides FSG (finite state grammars).

24. The system of claim 20, wherein the dialog manager employs mixed initiative.

25. The system of claim 20, wherein the dialog manager employs machine directed dialog.

26. The system of claim 20, wherein the dialog manager employs user directed dialog.

* * * * *